(12) United States Patent
Wang et al.

(10) Patent No.: US 11,119,465 B2
(45) Date of Patent: Sep. 14, 2021

(54) METHOD FOR INSPECTING DEFECTS OF MACHINING PATH

(71) Applicant: INDUSTRIAL TECHNOLOGY RESEARCH INSTITUTE, Hsinchu (TW)

(72) Inventors: Cheng-Wei Wang, Taipei (TW); Kuo-Hua Chou, Zhubei (TW); Chien-Chih Liao, Taichung (TW); Jen-Ji Wang, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 15/930,949

(22) Filed: May 13, 2020

(65) Prior Publication Data
US 2021/0208565 A1    Jul. 8, 2021

(30) Foreign Application Priority Data
Jan. 6, 2020   (TW) .................................. 109100301

(51) Int. Cl.
*G05B 19/4069* (2006.01)
*G05B 19/4068* (2006.01)
*G05B 19/41* (2006.01)
*G06T 17/20* (2006.01)
*G06T 7/00* (2017.01)

(52) U.S. Cl.
CPC ..... *G05B 19/4069* (2013.01); *G05B 19/4068* (2013.01); *G05B 19/41* (2013.01); *G06T 7/0004* (2013.01); *G06T 17/20* (2013.01)

(58) Field of Classification Search
None
See application file for complete search history.

(56) References Cited

U.S. PATENT DOCUMENTS

| 5,710,709 A | 1/1998 | Oliver et al. |
| 9,524,583 B2 | 12/2016 | Montana et al. |

(Continued)

FOREIGN PATENT DOCUMENTS

| CN | 103699056 B | 6/2016 |
| TW | I510874 B | 12/2015 |

(Continued)

OTHER PUBLICATIONS

Chen, "The Relationship Between the CNC Controller Parameters and the Machining Path," Mar. 1, 2017, pp. 90-103.

*Primary Examiner* — Ryan A Jarrett
(74) *Attorney, Agent, or Firm* — Birch, Stewart, Kolasch & Birch, LLP

(57) ABSTRACT

A method for inspecting defects of a machining path is provided. The method includes the following steps. Firstly, a contour mold with a plurality of surface nodes is generated according to a machining program code. Next, a normal vector of each surface node of the contour mold is calculated. Then, a tangent vector of a block of the machining program code corresponding to the normal vector is calculated. Afterwards, an error information is obtained according to a relation between the normal vector and the tangent vector. When the error information is greater than a predetermined value, a defect information is shown on the contour mold.

10 Claims, 8 Drawing Sheets

(56) References Cited

U.S. PATENT DOCUMENTS

| | | | | |
|---|---|---|---|---|
| 2010/0315419 A1* | 12/2010 | Baker | ............... | G06T 17/10 |
| | | | | 345/420 |
| 2019/0333272 A1* | 10/2019 | Tsuchie | ............... | G06T 17/30 |
| 2020/0166906 A1* | 5/2020 | Wang | ............... | G05B 19/4069 |
| 2021/0048791 A1* | 2/2021 | Ma | ............... | G05B 19/4166 |
| 2021/0150077 A1* | 5/2021 | Tsuchie | ............... | G06T 19/00 |

FOREIGN PATENT DOCUMENTS

| | | |
|---|---|---|
| TW | I512418 B | 12/2015 |
| TW | I524162 B | 3/2016 |
| TW | I645274 B | 12/2018 |

* cited by examiner

METHOD FOR INSPECTING DEFECTS OF MACHINING PATH

This application claims the benefit of Taiwan application Serial No. 109100301, filed Jan. 6, 2020, the disclosure of which is incorporated by reference herein in its entirety.

TECHNICAL FIELD

The disclosure relates in general to a defect inspection method, and more particularly to a method for inspecting defects of a machining path of a machining program code.

BACKGROUND

When generating a machining path using a computer aided design (CAD) software and a computer aided manufacturing (CAM) software, due to software difference, the mold surface of the work piece may easily have problems with file conversion, and the generated machining path may have defects that can hardly be detected by human eyes. These problems normally are not noticed until abnormal patterns are found during the surface inspection of the final product having gone through the cutting process. Therefore, it has become a prominent task for the industries to provide a method which inspects whether the machining path of the machining program code has defects or not before the cutting process is performed.

SUMMARY

The disclosure is directed to a method for inspecting defects of a machining path to resolve the above problems.

According to one embodiment of the present invention, a method for inspecting defects of a machining path is provided. The method includes the following steps. Firstly, a contour mold with a plurality of surface nodes is generated according to a machining program code. Next, a normal vector of each surface node of the contour mold is calculated. Then, a tangent vector of a block of the machining program code corresponding to the normal vector is calculated. Afterwards, an error information is obtained according to a relation between the normal vector and the tangent vector. When the error information is greater than a predetermined value, a defect information is shown on the contour mold.

The above and other aspects of the invention will become better understood with regard to the following detailed description of the preferred but non-limiting embodiment(s). The following description is made with reference to the accompanying drawings.

Figure 1:
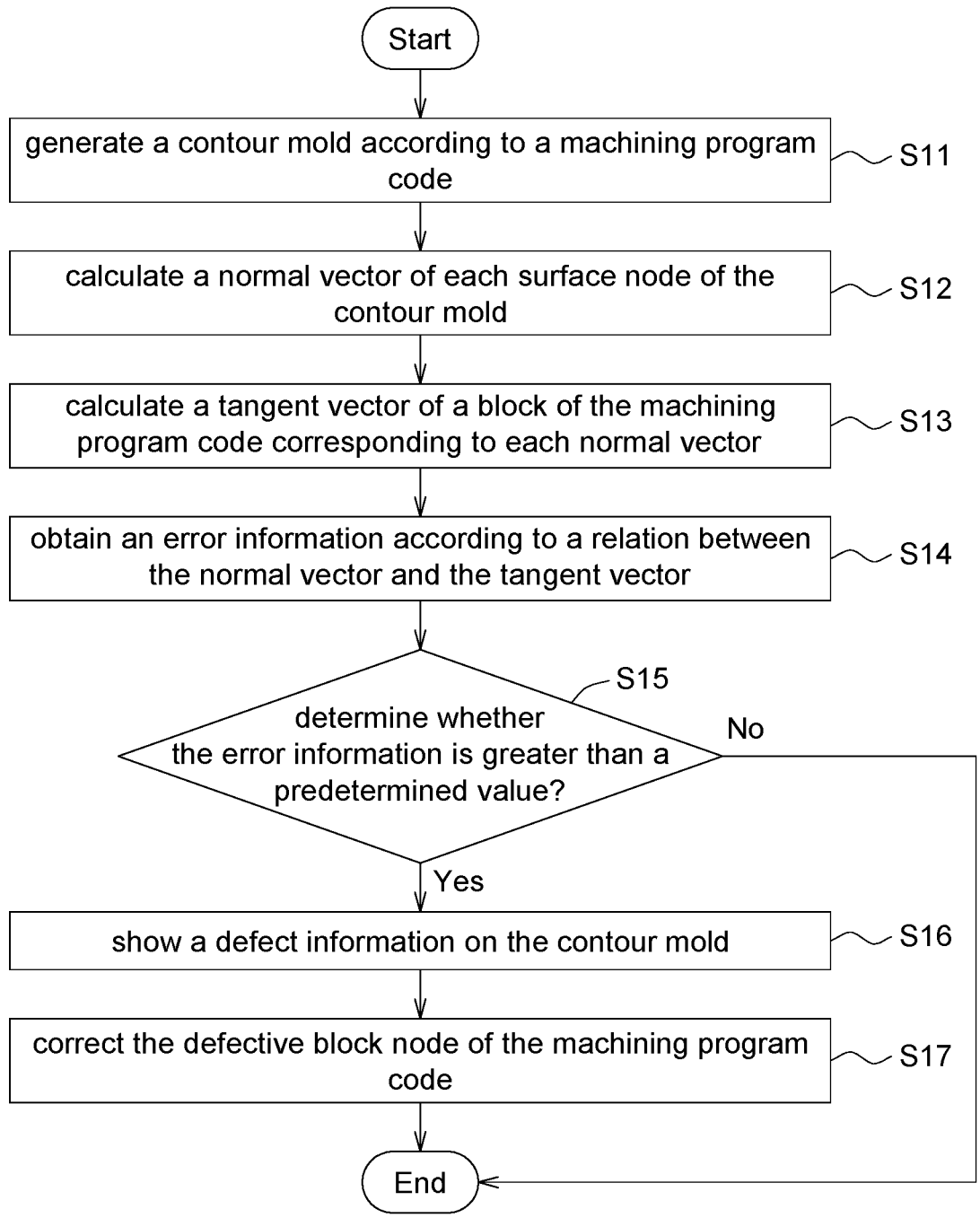
FIG. 1 is a flowchart of a method for inspecting defects of a machining path according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Each embodiment of the present disclosure is described below with accompanying drawings. Apart from these detailed descriptions, the present disclosure can further be widely used in other embodiments, and any substitutions, modifications or equivalent changes of the embodiments are within the scope of the present disclosure, and the claims disclosed below shall prevail. For the present disclosure to be clearly and comprehensively understood, a number of details and exemplary embodiments are disclosed below with detailed descriptions. However, these details and exemplary embodiments are for explanatory and exemplary purposes only, not for limiting the present disclosure. Besides, the generally known steps or elements are not described in the specification to avoid causing unnecessary restrictions to the present disclosure. For the accompanying drawings to be illustrated more clearly, elements of the accompanying drawings may not reflect actual sizes. Besides, some elements may be omitted in the accompanying drawings. It should be noted that the drawings are for explanatory and exemplary purposes only, and may not reflect actual sizes or quantities of the elements unless specified.

Referring to FIG. 1, a flowchart of a method for inspecting defects of a machining path 10 according to an embodiment of the present disclosure is shown. The method for inspecting defects of a machining path 10 can be performed by a computing device, such as an independent computer or a controller of a machine tool, to inspect defects on the machining path without physically connecting to the machine tool. In other words, the method for inspecting defects of a machining path 10 of the present disclosure can inspect whether the machining path has defects without using the information of physical position transmitted from the machine tool.

The method for inspecting defects of a machining path 10 at least includes step S11 to step S16 for inspecting whether the machining path has defects. Firstly, the method begins at step S11, a contour mold is generated according to a machining program code. The machining program code, such as such as the numerical control code (NC code) or other instruction code used to control the actuation of the machine tool, is formed of a plurality of instructions inputted to the machine tool to drive the machine tool to actuate.

Figure 2:
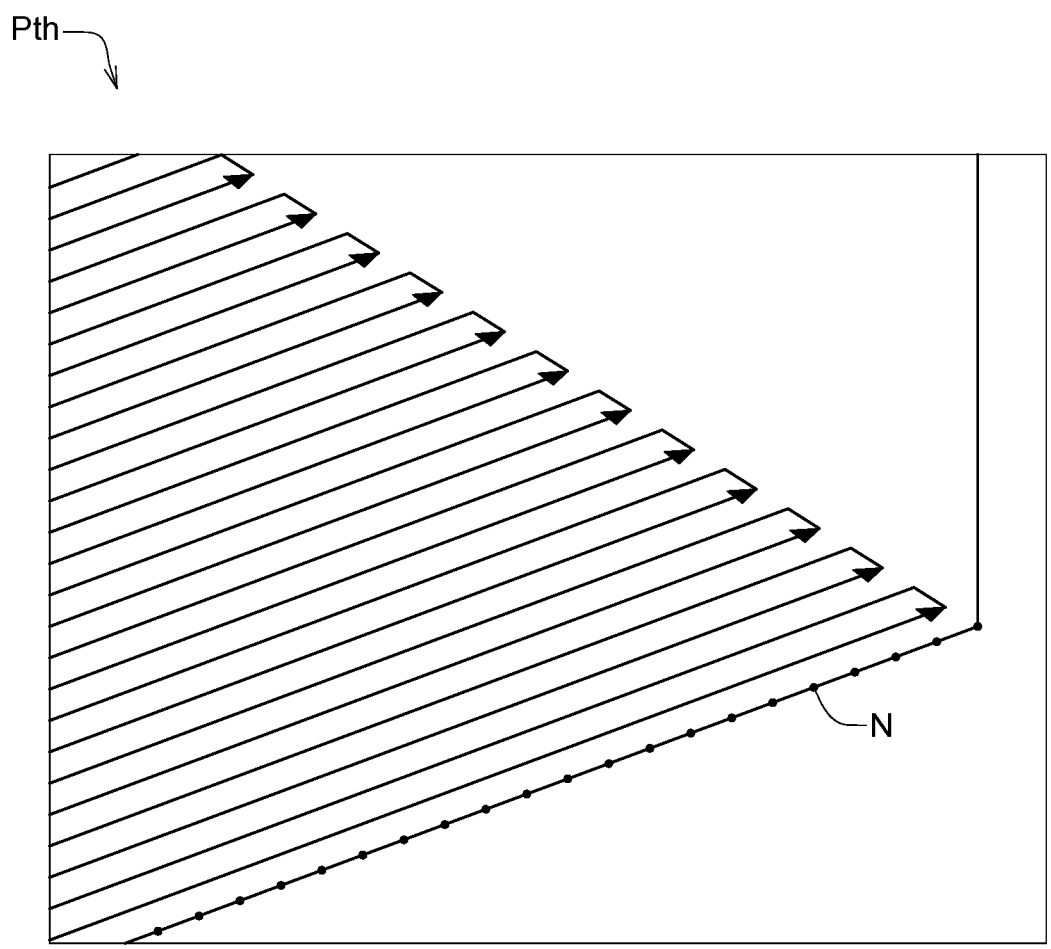
FIG. 2 is a schematic diagram of a machining path formed by a machining program code according to an embodiment of the present disclosure.

As indicated in FIG. 2, a schematic diagram of a machining path Pth formed by a machining program code according to an embodiment of the present disclosure is shown. The machining program code has a plurality of path trajectories. Each path trajectory is formed of a plurality of block nodes N. The path connecting two adjacent block nodes N is referred as a block. Each block node N has a 3D coordinate data. After the machining program code is inputted to the machine tool, the tool of the machine tool will move along the path trajectories of the machining path Pth to cut the work piece into a desired final product.

Figure 3A:
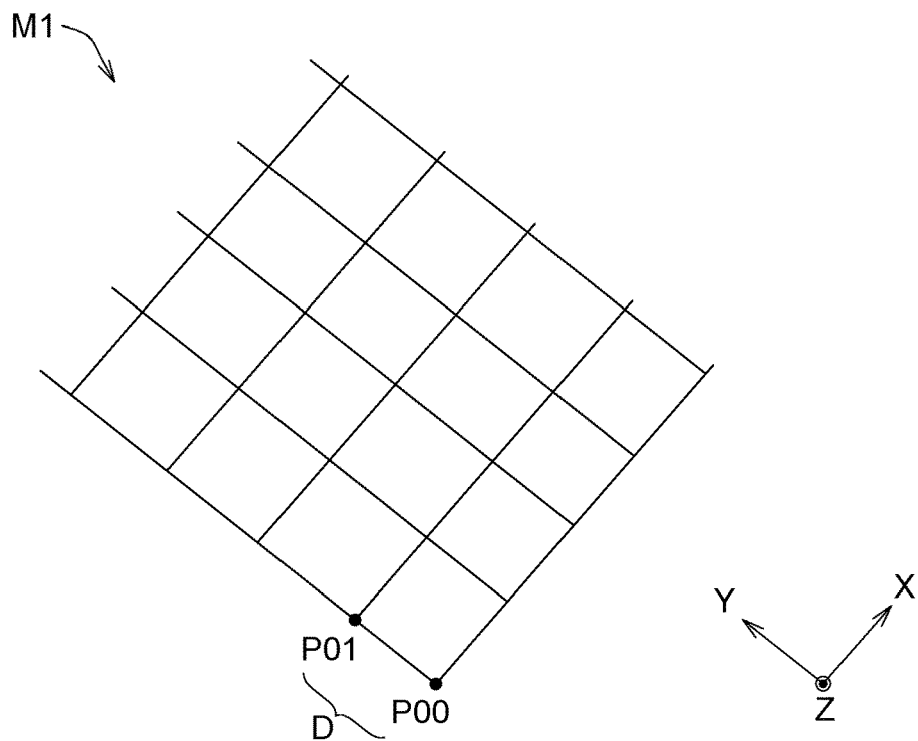
FIG. 3A is a schematic diagram of a 2D mesh according to an embodiment of the present disclosure.

In step S11, firstly a virtual 2D mesh is drawn. Referring to FIG. 3A, a schematic diagram of a 2D mesh M1 according to an embodiment of the present disclosure is shown. The 2D mesh M1, which may have the pattern of a checkerboard, includes a plurality of mesh points, such as mesh points P00, P01 . . . and so on. Each mesh point has an X coordinate value and a Y coordinate value. It should be noted that the scope of the 2D mesh M1 should include the X coordinate values and the Y coordinate values of all block nodes N of the machining program code. That is, if all block nodes N of the machining program code are vertically projected onto the XY plane, all of the block nodes N should fall within the scope of the 2D mesh M1.

As indicated in FIG. 3A, the distance between two adjacent mesh points is defined as a grid size D, which should be approximately similar to the block length of the machining program code. For example, the grid size D may be equivalent to or slightly less than the block length of the machining program code. In the present embodiment, the grid size D is equivalent to the block length of the machining program code.

Figure 3B:
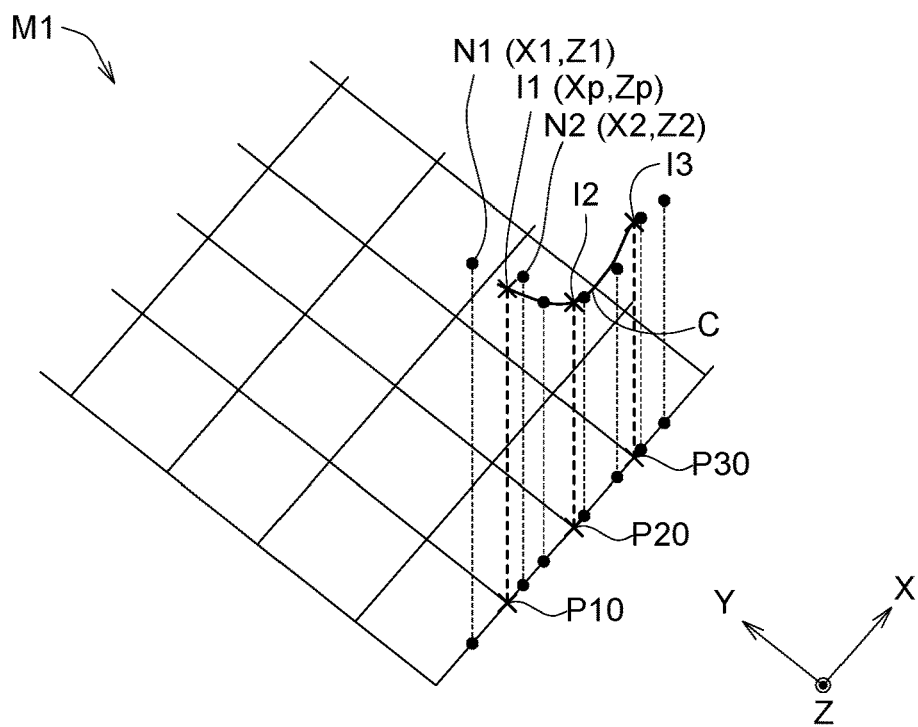
FIG. 3B is a schematic diagram of interpolating the Z coordinate of the mesh points of the 2D mesh of FIG. 3A.

After the drawing of the 2D mesh M1 is completed, the Z coordinate of each mesh point of the 2D mesh M1 is interpolated to obtain the corresponding Z coordinate value or interpolation value of each mesh point. Referring to FIG. 3B, a schematic diagram of interpolating the Z coordinate of the mesh points of the 2D mesh M1 of FIG. 3A is shown. When each block node (such as the block node N1 or N2) of the machining program code is vertically projected onto the XY plane, the projected point does not necessarily correspond to the mesh points (such as mesh points P10, P20 and P30) of the 2D mesh M1. Therefore, the Z coordinate for each mesh point of the 2D mesh M1 is interpolated to obtain the corresponding Z coordinate value for each mesh point, such that each mesh point may correspond to the 3D coordinate data of the machining program code and the contour mold may be obtained accordingly.

Figure 4:
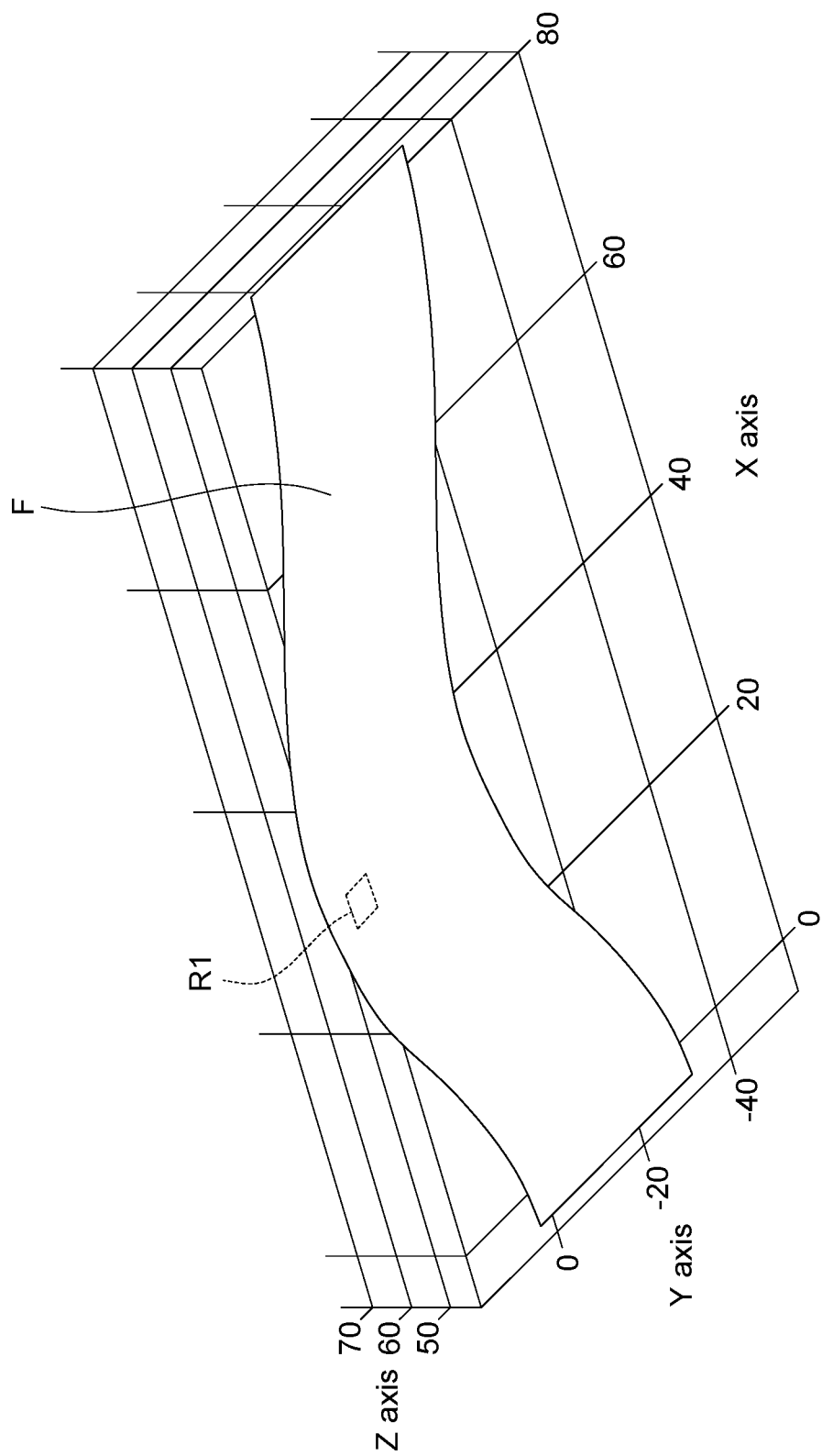
FIG. 4 is a schematic diagram of a contour mold according to an embodiment of the present disclosure.

For example, when interpolating the Z coordinate for the mesh point P10, a block node which has X coordinate value and Y coordinate value adjacent to that of the mesh point P10 is located, that is, the block nodes N1 and N2. Next, according to the X, Z coordinate values (X1,Z1) of the block node N1 and the X, Z coordinate values (X2,Z2) of the block node N2, the corresponding Z coordinate value (Zp) for the mesh point P10 may be obtained through interpolation (such as linear interpolation). Thus, the X, Z coordinate values of the point I1 separated from the mesh point P10 by distance of Zp along the direction of Z coordinate is (Xp, Zp). Next, other interpolation points I2, I3 . . . and so on are located by the same analogy. The interpolation points I1, I2, I3 . . . and so on may be smoothed and connected to form a curve C. After all interpolation points of the 2D mesh M1 are obtained, all curves may form a contour mold F similar to the actual product. Referring to FIG. 4, a schematic diagram of a contour mold F according to an embodiment of the present disclosure is shown. Here, the above interpolation points may be referred as surface nodes of the contour mold F.

Figure 5A:
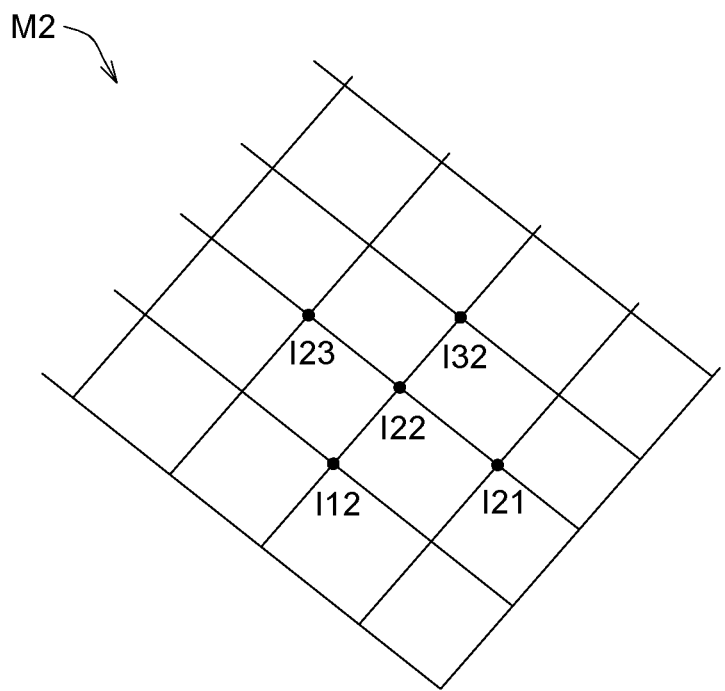
FIG. 5A is a schematic diagram of a 3D mesh according to an embodiment of the present disclosure.

Next, as indicated in FIG. 1, after step S11 is completed, the method proceeds to step S12, a normal vector of each surface node of the contour mold F is calculated. It should be noted that the surface nodes (such as I1, I2, I3) obtained through the above interpolation further form a 3D mesh. Referring to FIG. 5A, a schematic diagram of a 3D mesh M2 according to an embodiment of the present disclosure is shown. In fact, the contour mold F should be represented in the form similar to the 3D mesh M2. However, since the size of each grid of 3D mesh M2 is very tiny, the contour mold F may be regarded as a curved surface formed of a plurality of tiny planes.

Also, refer to FIG. 4 and FIG. 5A. Since the size of each grid of 3D mesh M2 is very tiny, the 3D mesh M2 may be regarded as the grid of the 2D plane if sufficient tiny regions R1 may be captured from the contour mold F. Therefore, in step S12, the normal vector of each surface node may be calculated as follows.

Figure 5B:
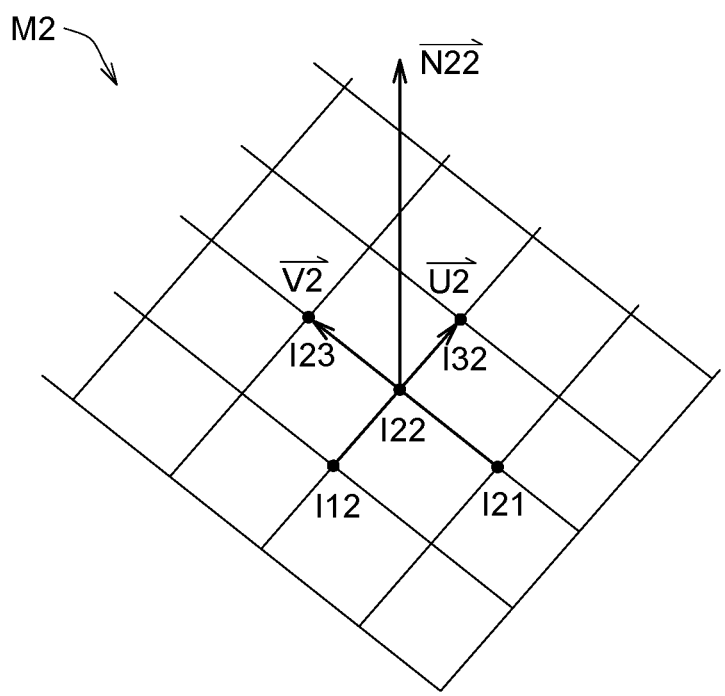
FIG. 5B is a schematic diagram of obtaining a normal vector of each surface node according to the 3D mesh of FIG. 5A.

Firstly, two vectors of the 3D mesh M2 passing through each surface node are located. For example, FIG. 5B is a schematic diagram of obtaining a normal vector $\vec{N22}$ of the surface node I22 according to the 3D mesh M2 of FIG. 5A. Refer to FIG. 5A and FIG. 5B. To locate the normal vector $\vec{N22}$ of the surface node I22, firstly the coordinates of the four surface nodes adjacent to the surface node I22 are located. The four surface nodes are such as surface node I12, I21, I32 and I23. Then, the vector $\vec{U2}$ sequentially passing through the surface nodes I12 and I32 is calculated, the vector $\vec{V2}$ sequentially passing through the surface nodes I21 and I23 is calculate, and the vector $\vec{U2}$ and the vector $\vec{V2}$ respectively pass through the surface node I22. Next, a vector cross product of the vector $\vec{U2}$ and the vector $\vec{V2}$ is calculated to obtain the normal vector $\vec{N22}$ of the surface node I22.

Figure 6A:
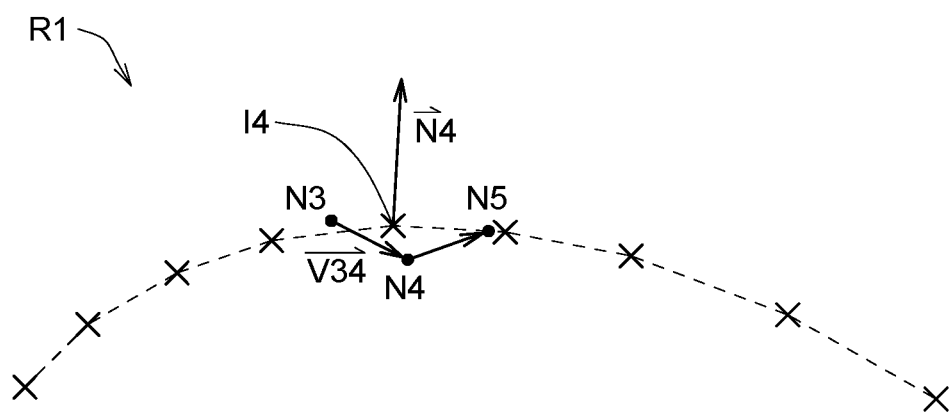
FIG. 6A is a schematic diagram of a relation between the normal vector and the tangent vector of the corresponding block according to an embodiment of the present disclosure.

Then, as indicated in FIG. 1, after step S12 is completed, the method proceeds to step S13, a tangent vector of a block of the machining program code corresponding to the normal vector is calculated. For example, referring to FIG. 6A, a relation between the normal vector $\vec{N4}$ and the tangent vector $\vec{V34}$ of the corresponding block according to an embodiment of the present disclosure is shown. In FIG. 6A, "×" represents the surface node as mentioned above, dotted line represents the 3D mesh as mentioned above, and the normal vector $\vec{N4}$ of the surface node I4 also may be obtained by the method disclosed above. Since the surface node I4 is obtained by performing interpolation on adjacent block nodes (such as the block nodes N3, N4), the block nodes N3, N4, and N5 do not necessarily fall on the 3D mesh represented by dotted lines.

In step S13, firstly, two block nodes, adjacent to the surface node having the normal vector, are located from the machining program code. For example, the surface node I4 is obtained by performing interpolation on two adjacent block nodes N3 and N4, and therefore, the two block nodes adjacent to the surface node I4 having the normal vector $\vec{N4}$ are the block nodes N3 and N4. Next, the tangent vector $\vec{V34}$ formed by the two block nodes N3 and N4 is obtained.

Afterwards, as indicated in FIG. 1, after the step S13 of calculating a tangent vector of a block of the machining program code corresponding to the normal vector is completed, the method proceeds to step S14, an error information is obtained according to a relation between the normal vector and the tangent vector.

In an embodiment, the error information is a difference between an angle formed between the normal vector and the tangent vector and the right angle 90°. For example, referring to FIG. 6B, a schematic diagram of obtaining an error information according to the relation between the normal vector $\vec{N4}$ and the tangent vector $\vec{V34}$ of FIG. 6A is shown. After the normal vector $\vec{N4}$ and the tangent vector $\vec{V34}$ are obtained, the angle α between the two vectors may be obtained according to the relation between the two vectors.

Figure 6B:
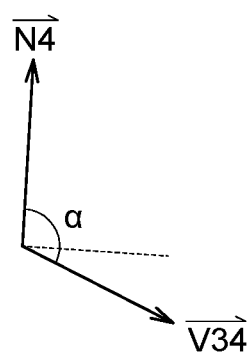
FIG. 6B is a schematic diagram of obtaining an error information according to the relation between the normal vector and the tangent vector of FIG. 6A.

Then, referring to FIG. 1, the method proceeds to step S15, whether the error information obtained in step S14 is greater than a predetermined value is determined. Let the error information be the difference between an angle formed between the normal vector and the tangent vector and the right angle 90° as an example, and the user may preset a predetermined value, such as an angle of 10°. As indicated in FIG. 1 and FIG. 6B, when the difference between an angle α formed between the normal vector and the tangent vector and the right angle 90° is greater than 10°, the method proceeds to step S16; when the difference is less than 10°, the method may selectively return to step 12 to calculate the next surface node or may directly terminate the method 10 after completing all calculations.

In step S16, a defect information is shown on the contour mold. The defect information, such as a defective block node of the machining program code, may be shown with different colors, brightness levels, gray levels or signs. Let the error information be an angle difference between the normal vector and the tangent vector as an example. When the angle difference is greater than the predetermined value, the defect information (such as a defective block node of the machining program code) may be shown with different colors, brightness levels, gray levels or signs on the contour mold F of FIG. 4 for the user to observe.

Furthermore, if the contour mold F shows a defect information, such as a defective block node of the machining program code, according to another embodiment of the present disclosure, the method proceeds to step S17 as shown in FIG. 1, the defective block node may be further corrected.

Figure 7A:
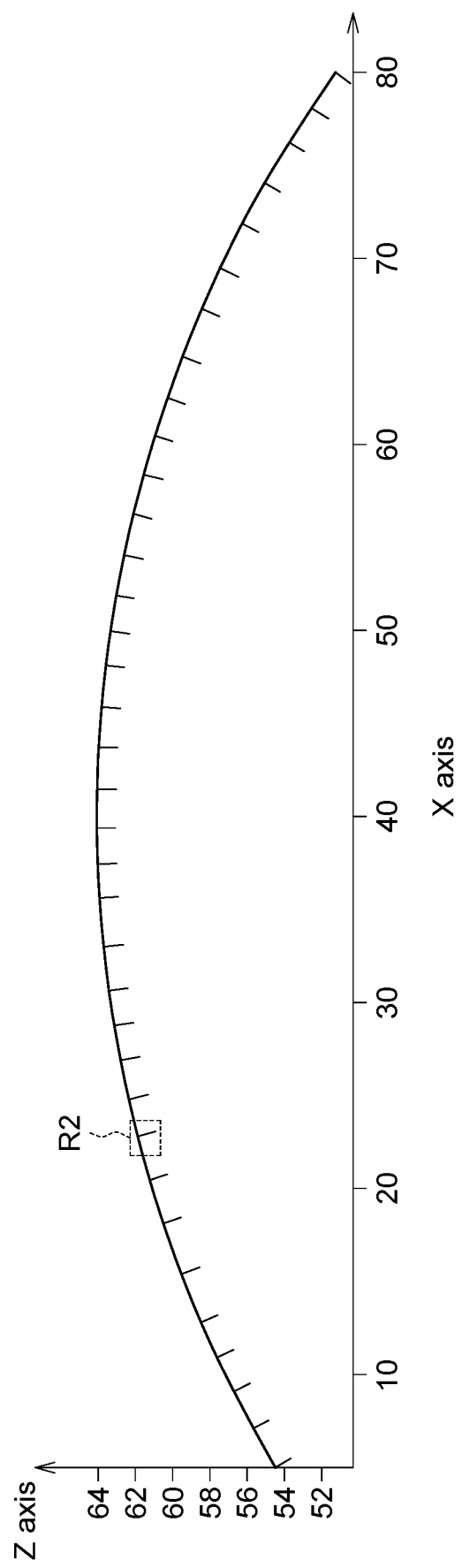
FIG. 7A is a schematic diagram of a machining path formed of a machining program code including a defective block node according to an embodiment of the present disclosure.
Figure 7B:
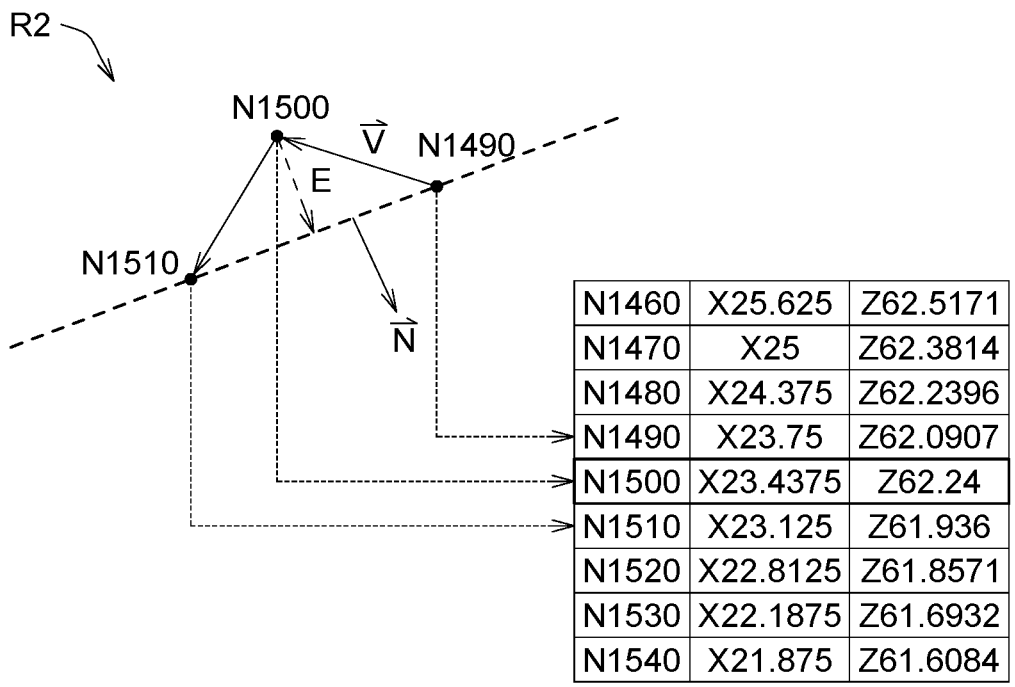
FIG. 7B and FIG. 7C are schematic diagrams of correcting a defective block node of the machining program code.
Figure 7C:
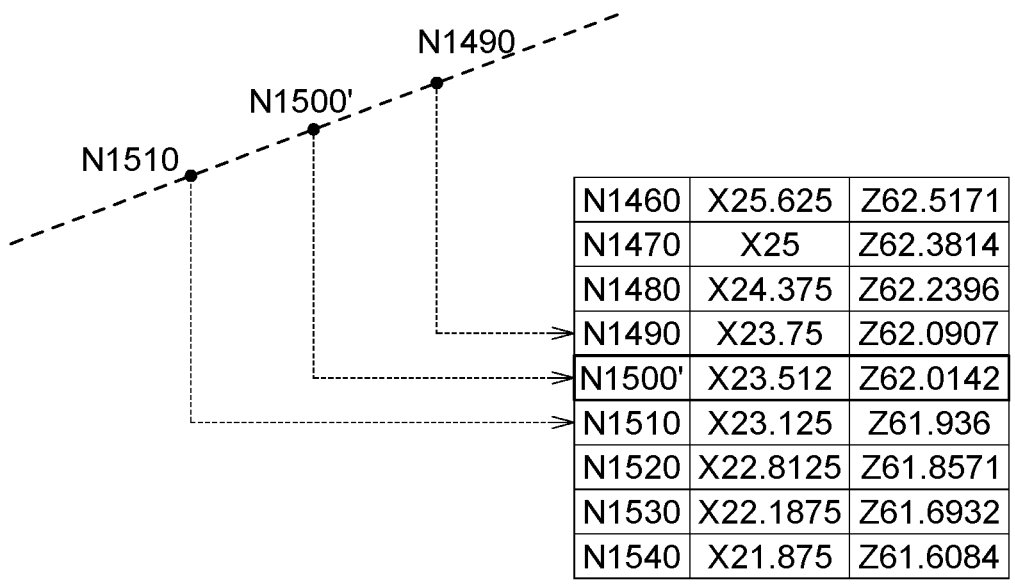

Refer to the embodiments of FIGS. 7A-7C. FIG. 7A is a schematic diagram of a machining path 10 formed of a machining program code including a defective block node according to an embodiment of the present disclosure. FIG. 7B and FIG. 7C are schematic diagrams of correcting a defective block node of the machining program code.

Refer to FIG. 7A. After steps S11-S15 of the method 10 for inspecting defects of a machining path of FIG. 1 are performed, a defective block node N1500 is found in region R2. An enlarged view of region R2 is illustrated in FIG. 7B. The region R2 includes the block nodes N1490, N1500 and N1510.

Refer to FIG. 7B. Let the error information be exemplified by an angle difference between the normal vector and the tangent vector. Since the angle difference between the normal vector $\vec{N}$ and the corresponding tangent vector $\vec{V}$ is greater than the predetermined value, the block node N1500 is regarded as a defective block node. Next, the defective block node N1500 may be corrected according to the angle difference.

Here, an overcut amount E may be calculated according to the angle. The overcut amount E may be obtained according to formula 1:

$$E = -\frac{(\vec{N} \cdot \vec{V})}{|\vec{N}|} \qquad \text{(formula 1)}$$

Next, the block node N1500 is moved along the direction of the normal vector $\vec{N}$ to compensate the overcut amount E and generate a corrected block node N1500' as indicated in FIG. 7C. Thus, an optimized machining path may be outputted according to the corrected result. The optimized machining path is represented by dotted lines. The original machining program code may be corrected according to the optimized machining path.

The method for inspecting defects of a machining path disclosed according to the present disclosure may inspect whether the machining path has defects or not according to the machining program code and may perform inspection even in the absence of a picture file. Besides, when the inspection result shows that the machining path has defects, the defective block node still may be partially corrected to generate an optimized machining path and machining program code.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for inspecting defects of a machining path, wherein the method is suitable to be performed by a computing device and comprises:
    generating a contour mold with a plurality of surface nodes according to a machining program code;
    calculating a normal vector of each of the surface nodes;
    calculating a tangent vector of a block of the machining program code corresponding to each normal vector;
    obtaining an error information according to a relation between the normal vector and the tangent vector; and
    showing a defect information on the contour mold when the error information is greater than a predetermined value.

2. The method for inspecting defects of the machining path according to claim 1, wherein the step of generating the contour mold according to the machining program code comprises:
    drawing a 2D mesh with a plurality of mesh points;
    locating two block nodes of one block adjacent to each of the mesh points, and performing interpolation on the mesh point along a coordinate axis according to the two block nodes to obtain a coordinate value corresponding to each of the mesh points, wherein a point having the coordinate value along the coordinate axis from the mesh point is the surface node; and
    smoothing the surface nodes to generate the contour mold.

3. The method for inspecting defects of the machining path according to claim 2, wherein the grid size of the 2D mesh is equivalent to the length of one block of the machining program code.

4. The method for inspecting defects of the machining path according to claim 1, wherein the surface nodes further form a 3D mesh.

5. The method for inspecting defects of the machining path according to claim 4, wherein the step of calculating the normal vector of each of the surface nodes comprises:
   locating two vectors of the 3D mesh passing through each of the surface nodes; and
   performing a vector cross product on the two vectors to obtain the normal vector of each of the surface nodes.

6. The method for inspecting defects of the machining path according to claim 1, wherein the step of calculating the tangent vector of the block of the machining program code corresponding to each normal vector comprises:
   locating two block nodes from the machining program code adjacent to the surface node having the normal vector; and
   obtaining the tangent vector formed by the two block nodes.

7. The method for inspecting defects of the machining path according to claim 1, wherein the error information is a difference between an angle formed between the normal vector and the tangent vector and a right angle.

8. The method for inspecting defects of the machining path according to claim 7, further comprising:
   correcting a corresponding defective block node of the machining program code according to the difference when the difference is greater than the predetermined value.

9. The method for inspecting defects of the machining path according to claim 8, wherein the step of correcting the corresponding defective block node of the machining program code according to the difference comprises:
   calculating an overcut amount according to the angle; and
   moving the defective block node along the direction of the normal vector to compensate the overcut amount.

10. The method for inspecting defects of the machining path according to claim 1, wherein the defect information is shown with different colors, brightness levels, gray levels or signs.

* * * * *